(12) United States Patent
Yamashita et al.

(10) Patent No.: US 9,950,688 B2
(45) Date of Patent: Apr. 24, 2018

(54) GAS GENERATOR

(71) Applicant: DAICEL CORPORATION, Osaka-shi, Osaka (JP)

(72) Inventors: Haruhiko Yamashita, Tatsuno (JP); Yusuke Komine, Tatsuno (JP)

(73) Assignee: DAICEL CORPORATION, Osaka-Shi (JP)

( * ) Notice: Subject to any disclaimer, the term of this patent is extended or adjusted under 35 U.S.C. 154(b) by 0 days.

(21) Appl. No.: 15/305,215

(22) PCT Filed: Apr. 8, 2015

(86) PCT No.: PCT/JP2015/060900
§ 371 (c)(1),
(2) Date: Oct. 19, 2016

(87) PCT Pub. No.: WO2015/174170
PCT Pub. Date: Nov. 19, 2015

(65) Prior Publication Data
US 2017/0050609 A1 Feb. 23, 2017

(30) Foreign Application Priority Data

May 16, 2014 (JP) ................................. 2014-101955
Mar. 9, 2015 (JP) ................................. 2015-045867

(51) Int. Cl.
*B60R 21/26* (2011.01)
*B60R 21/261* (2011.01)
*B60R 21/264* (2006.01)

(52) U.S. Cl.
CPC ........ *B60R 21/261* (2013.01); *B60R 21/2644* (2013.01); *B60R 2021/2612* (2013.01); *B60R 2021/26029* (2013.01)

(58) Field of Classification Search
CPC .............. B60R 21/262; B60R 21/2644; B60R 2021/2648; Y10T 29/49863
(Continued)

(56) References Cited

U.S. PATENT DOCUMENTS 5,470,104 A 11/1995 Smith et al.
5,494,312 A 2/1996 Rink
(Continued)

FOREIGN PATENT DOCUMENTS

JP 8-53046 A 2/1996
JP 2001-97176 A 4/2001
(Continued)

*Primary Examiner* — Toan To
(74) *Attorney, Agent, or Firm* — Birch, Stewart, Kolasch & Birch, LLP.

(57) ABSTRACT

The present invention provides a gas generator in which an effect of decreasing the temperature of a combustion gas and an effect of capturing mist of the combustion gas are adjusted.

A cup member disposed in a cylindrical housing has one gas passage hole selected from a first gas passage hole, which is formed in part of a circumferential wall on the side of an opening, a second gas passage hole, which is formed in part of a circumferential wall on the side of a bottom portion, and a third gas passage hole, which is formed between the first gas passage hole and the second gas passage hole. By selecting one of the above gas passage holes, the effect of decreasing the temperature of the combustion gas and the effect of capturing mist of the combustion gas are adjusted.

9 Claims, 3 Drawing Sheets

(58) Field of Classification Search
USPC ......... 280/737, 740, 741, 742; 102/530, 531
See application file for complete search history.

(56) References Cited

U.S. PATENT DOCUMENTS

| | | | |
|---|---|---|---|
| 5,531,473 | A | 7/1996 | Rink et al. |
| 6,412,815 | B1 | 7/2002 | Nakashima et al. |
| 6,808,204 | B1 * | 10/2004 | Katsuda ................ B60R 21/272 280/741 |
| 7,654,565 | B2 * | 2/2010 | McCormick ........ B60R 21/2644 280/736 |
| 7,878,536 | B2 * | 2/2011 | Rose ................... B60R 21/2644 280/737 |
| 9,114,778 | B2 * | 8/2015 | Hanano ............... B60R 21/2644 |
| 2006/0273564 | A1 | 12/2006 | McCormick et al. |
| 2008/0078486 | A1 | 4/2008 | Khandhadia et al. |
| 2010/0201111 | A1 * | 8/2010 | Yamazaki ............. B60R 21/261 280/741 |
| 2010/0290959 | A1 | 11/2010 | Yamazaki et al. |
| 2011/0187088 | A1 | 8/2011 | Hanano et al. |
| 2011/0254254 | A1 * | 10/2011 | Numoto ................ B60R 21/263 280/741 |
| 2016/0200283 | A1 * | 7/2016 | Hanano ............... B60R 21/2644 102/530 |

FOREIGN PATENT DOCUMENTS

| | | |
|---|---|---|
| JP | 2008-546513 A | 12/2008 |
| JP | 2010-264773 A | 11/2010 |
| JP | 2011-157025 A | 8/2011 |
| WO | WO 2006/130848 A2 | 12/2006 |

* cited by examiner

GAS GENERATOR

TECHNICAL FIELD

The present invention relates to a gas generator used for, for example, a restraining device for a vehicle, such as an airbag apparatus, and more particularly to a gas generator used for an airbag system for deploying an airbag to the side of an occupant.

DESCRIPTION OF RELATED ART

Most of gas generators used for an apparatus deploying an airbag to the side of an occupant have an elongated cylindrical shape due to its mounting location. The gas generator is disposed inside a vehicle by orienting the axis of a cylindrical housing in a substantially vertical direction or a horizontal direction.

US-A No. 2008/0078486 discloses a gas generator in which an initiator 32 is disposed at one end of an elongated outer housing 12 and a diffuser portion formed with gas exit openings 20 is provided at the opposite end thereof.

In this gas generator, a booster cup 23, which accommodates a booster composition 24, and a divider 28, which is formed with an opening 28a, are disposed in the proximity of the initiator 32. A gas generant 16 is disposed in a space formed by an inner housing 14. A cylindrical gas passage is formed between the inner housing 14 and an outer housing 12.

Further, a cup member of a double-wall structure is disposed between the inner housing 14 and a diffuser having gas exit openings 20. A gas passage hole is formed closer to the diffuser portion in the circumferential wall portion of the cup member of a double-wall structure. The length of the cup member of a double-wall structure in the axial direction is significantly shorter than those of the outer housing 12 and the inner housing 14.

The booster composition 24 burned by the initiator 32 generates a combustion product, and the combustion product enters the inside of the inner housing 14 from the opening 28a and burns the gas generant 16.

The gas generated from the gas generant 16 passes through an orifice 18 of the inner housing 14 and a cylindrical gap between the outer housing 12 and the inner housing 14, then goes through the cup member of a double-wall structure and is discharged from the gas exit openings 20 of the diffuser portion.

The inner housing 14 and the cup member of a double-wall structure form a zigzag path for the gas flow, and no conventional filter is used.

In JP-A No. 2011-157025, FIG. 2 shows a gas generator in which a tubular member 30 and a cup-shaped member 40 serving as a gas diverting member are disposed inside a cylindrical housing 10.

A plurality of gas passage holes 37 are formed at axially different locations in the circumferential wall portion of the tubular member 30, and a plurality of communication holes 40c are formed at axially the same locations in the circumferential wall portion of the cup-shaped member 40 serving as a gas diverting member.

The axial length of the cup-shaped member 40 serving as a gas diverting member is significantly shorter than those of the cylindrical housing 10 and the tubular member 30.

A combustion gas generated in a first combustion chamber 20 and a second combustion chamber 25 advances axially in a tubular gap 35, while flowing in and out of the plurality of gas passage holes 37, enters the cup-shaped member 40 from the plurality of communication holes 40c, and is then discharged from a gas discharge port 15 of a diffuser portion 12. No filter is used also in this gas generator.

SUMMARY OF INVENTION

Invention 1 of the present invention provides a gas generator including:

a cylindrical housing in which an ignition device is attached at a first end portion and a diffuser portion having a gas discharge port is attached at a second end portion on the opposite side of the first end portion, a combustion chamber, which is formed on the side of the ignition device, and a cup member, which serves as a gas diverting member and is disposed between the combustion chamber and the diffuser portion, being provided inside the cylindrical housing, a ratio (L2/L1) of a length (L2) of the cup member serving as the gas diverting member and a length (L1) of the cylindrical housing being 0.2 to 0.4, the cup member serving as the gas diverting member being disposed such that a bottom portion is located on the side of the combustion chamber, an opening is located on the side of the diffuser portion and a circumferential wall portion forms a cylindrical space serving as a gas passage with an inner circumferential wall surface of the cylindrical housing therebetween, the cup member having one gas passage hole selected from:

a first gas passage hole that is formed in part of the circumferential wall portion on the side of the opening and faces the cylindrical space serving as the gas passage;

a second gas passage hole that is formed in part of the circumferential wall portion on the side of the bottom portion and faces the cylindrical space serving as the gas passage; and a third gas passage hole that is formed between the first gas passage hole and the second gas passage hole and faces the cylindrical space serving as the gas passage, the cylindrical space serving as the gas passage communicating with the combustion chamber and being closed on the side of the diffuser portion.

Invention 2 of the present invention provides a gas generator including:

a cylindrical housing in which an ignition device is attached at a first end portion and a diffuser portion having a gas discharge port is attached at a second end portion on the opposite side of the first end portion, a combustion chamber, which is formed on the side of the ignition device, and a cup member, which serves as a gas diverting member and is disposed between the combustion chamber and the diffuser portion, being provided inside the cylindrical housing, a ratio (L2/L1) of a length (L2) of the cup member serving as the gas diverting member and a length (L1) of the cylindrical housing being 0.2 to 0.4, a cylindrical member, which has a plurality of through-holes in a circumferential wall portion, being disposed inside the combustion chamber, the cylindrical member being disposed such that an opening is located on the side of the ignition device, a bottom portion is located on the side of a bottom portion of the a cup member serving as a gas diverting member, and a circumferential wall portion forms a first cylindrical space serving as a first gas passage with an inner circumferential wall surface of the cylindrical housing therebetween, the cup member serving as the gas diverting member being disposed such that a bottom portion is located on the side of the combustion chamber, an opening is located on the side of the diffuser portion and a circumferential wall portion forms a second cylindrical space serving as a second gas passage with an inner circumferential wall surface of the cylindrical housing therebetween, the cup member having one gas passage hole selected from:

a first gas passage hole that is formed in part of the circumferential wall portion on the side of the opening and faces the second cylindrical space serving as the second gas passage;

a second gas passage hole that is formed in part of the circumferential wall portion on the side of the bottom portion and faces the second cylindrical space serving as the second gas passage; and a third gas passage hole that is formed between the first gas passage hole and the second gas passage hole and faces the second cylindrical space serving as the second gas passage, the second cylindrical space serving as the second gas passage communicating with the first cylindrical space and being closed on the side of the diffuser portion.

BRIEF DESCRIPTION OF DRAWINGS

The present invention will become more fully understood from the detailed description given hereinbelow and the accompanying drawings which are given by way of illustration only, and thus are no limitative of the present invention and wherein.

DETAILED DESCRIPTION OF INVENTION

In the gas generators of US-A No. 2008/0078486 and JP-A No. 2011-157025, the gas temperature is lowered and an amount of mist of the gas is reduced by increasing the complexity of the gas discharge path from the combustion chamber filled with the gas generating agent to the gas discharge port. The mist is high-temperature fine particles which are contained in the combustion gas (derived from a metal component included in the gas generating agent).

The present invention provides a gas generator in which an effect of cooling the combustion gas and an effect of capturing the mist can be adjusted in a properly balanced manner in accordance with a composition of the gas generating agent to be used, by improving parts corresponding to the cup member of a double-wall structure in the gas generator disclosed in US-A No. 2008/0078486 and the cup-shaped member serving as the gas diverting member in the gas generator disclosed in JP-A No. 2011-157025.

The basic structure of the gas generator of the present invention is similar to that of the gas generator depicted in FIG. 1 in JP-A No. 2011-157025, but the "cup-shaped member 40 serving as the gas diverting member" depicted in this FIG. 1 is different from the "cup member serving as the gas diverting member" in the present invention, and the obtained function and effect are also different due to the difference.

A known electric igniter or a combination of the electric igniter and a transfer charge (or a gas generating agent) can be used as the ignition device.

The ignition device (the electric igniter) is attached, for example, by crimping the opening at the first end portion of the cylindrical housing.

The diffuser portion is fixed by closing and welding the opening at the second end portion of the cylindrical housing.

A cup-shaped diffuser portion having a gas discharge port in a circumferential surface and having a flange portion in an opening can be used. Such a diffuser portion is also used in the gas generator depicted in FIG. 1 and FIG. 2 in US-A No. 2008/0078486 and the gas generator depicted in FIG. 1 in JP-A No. 2011-157025. However, the diffuser portion is not limited thereto, and a tabular or tray-shaped diffuser portion can be used.

The combustion chamber is a space filled with a gas generating agent serving as a gas source. The combustion chamber is formed by a space surrounded by the inner wall surface of the cylindrical housing, the ignition device and the cup member (the bottom portion of the cup member) serving as a gas diverting member.

In the gas generator of the present invention, the ratio (L2/L1) of the length (L2) of the cup member serving as a gas diverting member and the length (L1) of the cylindrical housing is 0.2 to 0.4, preferably 0.25 to 0.4, and even more preferably 0.3 to 0.4.

L1 is a length between the openings at both ends of the cylindrical housing, and L2 is a length from the opening to the outer surface of the bottom portion in the cup member serving as a gas diverting member.

The L2/L1 is larger than the ratio corresponding to the L2/L1 which is determined from FIG. 1 and FIG. 2 in US-A No. 2008/0078486 and FIG. 1 in JP-A No. 2011-157025.

As a result of such increase in the L2/L1 ratio, a gas passage hole can be formed in the cup member at a location selected from the axially different locations of the first gas passage hole to the third gas passage hole.

The first gas passage hole is formed in part of the circumferential wall portion on the side of the opening of the cup member and faces the cylindrical space serving as the gas passage.

The second gas passage hole is formed in part of the circumferential wall portion on the side of the bottom portion of the cup member and faces the cylindrical space serving as the gas passage.

The third gas passage hole is formed between the first gas passage hole and the second gas passage hole and faces the cylindrical space serving as the gas passage.

The cylindrical space serving as the gas passage communicates with the combustion chamber and is closed on the side of the diffuser portion. The cylindrical space serving as the gas passage is not filled with the gas generating agent.

Since the cup member serving as a gas diverting member has a gas passage hole at a location selected from the locations of the first gas passage hole to the third gas passage hole, it is possible to obtain a function and an effect that differ in accordance with the locations of the gas passage holes.

When the cup member has the first gas passage hole, a length of the gas passage (the cylindrical space) from the combustion chamber to the first gas passage hole is the largest, and the combustion gas contacts with the wall surface (the inner wall surface of the cylindrical housing and the outer wall surface of the cup member) of the gas passage over a longer period of time. As a result, the effect of decreasing the temperature of the combustion gas is enhanced.

When the cup member has the second gas passage hole, a length of the gas passage (the cylindrical space) from the combustion chamber to the second gas passage hole is the smallest. Therefore, the effect of decreasing the temperature of the combustion gas is less by comparison with that attained with the first gas passage hole, but the depth from the second gas passage hole to the closing surface of the gas passage (the cylindrical space) is the largest. As a result, a pocket portion is formed from the second gas passage hole to the closing surface of the gas passage (the cylindrical space), thereby enhancing the effect of capturing the mist.

When the cup member has the third gas passage hole, the effect of decreasing the temperature of the combustion gas is: the first gas passage hole>the third gas passage hole>the second gas passage hole, and the effect of capturing the mist of the combustion gas is: the second gas passage hole>the third gas passage hole>the first gas passage hole.

Therefore, the effect of decreasing the temperature of the combustion gas and the effect of capturing the mist of the combustion gas can be adjusted by shifting the axial location of the third gas passage hole closer to the first gas passage hole, shifting the axial location of the third gas passage hole closer to the second gas passage hole, or setting the axial location of the third gas passage hole at the middle therebetween.

In the gas generator of the present invention, by selecting the gas passage hole of the cup member serving as a gas diverting member from the first gas passage hole, the second gas passage hole, and the third gas passage hole in accordance with a type of the gas generating agent (a level of combustion temperature, a content ratio of the metal becoming a mist source), it is possible to adjust the effect of decreasing the temperature of the combustion gas and the effect of capturing the mist of the combustion gas.

The gas generator of Invention 2 of the present invention is different in that a cylindrical member is added in the gas generator of Invention 1 of the present invention.

The cylindrical member is disposed in the combustion chamber, and part or the whole of the inner wall surface of the combustion chamber in the radial direction is formed by the cylindrical member.

The outer surface of the bottom portion of the cylindrical member and the outer surface of the bottom portion of the cup member are in contact with each other.

Since the cylindrical member is used, a first cylindrical space serving as a first gas passage is formed between the circumferential wall portion of the cylindrical member and the inner circumferential wall surface of the cylindrical housing.

The first cylindrical space serving as a first gas passage communicates with a second cylindrical space which is a second gas passage formed between the circumferential wall portion of the cup member serving as a gas diverting device and the inner circumferential wall surface of the cylindrical housing.

The first gas passage (the first cylindrical space) and the second gas passage (the second cylindrical space) are not filled with the gas generating agent.

A ratio ($L_{12}/L_{11}$) of a length ($L_{12}$) of the second cylindrical space serving as the second gas passage and a length ($L_{11}$) of the first cylindrical space serving as the first gas passage is preferably within a range of 0.40 to 0.60. The length ($L_{11}$) of the first cylindrical space serving as the first gas passage is a length from the opening to the outer surface of the bottom portion in the cylindrical member, and the length ($L_{12}$) of the second cylindrical space serving as the second gas passage is the same as the length ($L_2$) of the cup member.

When the combustion gas passes through the first cylindrical space serving as the first gas passage, the mist adheres to the inner circumferential surface of the cylindrical housing and the outer wall surface (a wall surface where through-holes are not present) of the cylindrical member and is captured. Therefore, the effect of capturing the mist is enhanced by comparison with that attained with the gas generator of Invention 1 of the present invention.

Similarly to the gas generator of Invention 1 of the present invention, in the gas generator of Invention 2 of the present invention, the cup member serving as a gas diverting member has one gas passage hole selected from the first gas passage hole to the third gas passage hole. Therefore, the above-mentioned effect of decreasing the temperature of the combustion gas and the effect of capturing the mist of the combustion gas can be adjusted.

In the cup member serving as a gas diverting member, when a length from the opening to the outer surface of the bottom portion in the cup member is taken as 1, it is preferred that the first gas passage hole is formed within a range of 0.25 from the opening, the second gas passage hole is formed within a range of 0.75 to 1 from the opening, and the third gas passage hole is formed within a range of 0.3 to 0.7 from the opening.

By restricting the formation ranges of the first gas passage hole to the third gas passage hole, the effect of decreasing the temperature of the combustion gas and the effect of capturing the mist of the combustion gas are adjusted more easily.

It is preferred that each of the first gas passage hole, the second gas passage hole and the third gas passage hole is formed as two to eight holes arranged equidistantly in the circumferential direction.

The combustion chamber of the gas generator of the present invention can be divided into two combustion chambers by two porous plate members disposed at a distance from each other.

By using the two porous plate members, it is possible to adjust a volume of the combustion chamber in accordance with an amount of the gas generating agent filled in the combustion chamber.

In the gas generator of the present invention, by adjusting an axial location of the gas passage hole in the cup member serving as a gas diverting member, it is possible to adjust the effect of decreasing the temperature of the combustion gas and the effect of capturing the mist of the combustion gas in accordance with a type of the gas generating agent (a level of combustion temperature and a content ratio of the metal becoming a mist source).

DESCRIPTION OF EMBODIMENTS

Figure 1:
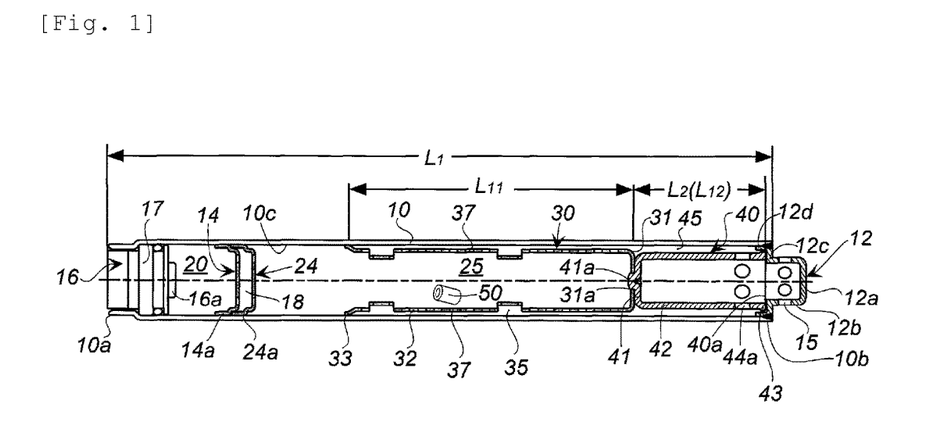
FIG. 1 shows a cross-sectional view in the axial direction of a gas generator of the present invention.

An embodiment of the present invention will be described with reference to FIG. 1. FIG. 1 shows a cross-sectional view of a gas generator in the axial direction.

An igniter 16 serving as an ignition device is attached at a first end portion 10a of a cylindrical housing 10. The igniter 16 is a known electric igniter and an ignition portion 16a thereof including an ignition charge protrudes from a collar 17.

A diffuser portion 12 is attached at a second end portion 10b which is opposite to the first end portion 10a of the cylindrical housing 10.

The diffuser portion 12 is in a substantially cup-like shape having a bottom portion 12a and a circumferential wall portion 12b. A flange portion 12c and an annular wall portion 12d, which is bent inward from the flange portion 12c, are provided at an opening of the diffuser portion.

The diffuser portion 12 is fixed by welding to the second end portion 10b of the cylindrical housing 10 at the flange portion 12c and the annular wall portion 12d.

A plurality of gas discharge ports 15 are formed in the circumferential wall portion 12b. The gas discharge ports are closed from the inside with a seal tape made of a metal, such as aluminum, to prevent moisture penetration.

A cup member 40 serving as a diverting member is disposed on the side of the diffuser portion 12 in the cylindrical housing 10.

A space between the ignition device 16 of the cylindrical housing 10 and the cup member 40 is a combustion chamber (a first combustion chamber 20 and a second combustion chamber 25).

A first porous plate member 14 is disposed on the side of the igniter 16 in the cylindrical housing 10 at a distance from the igniter 16. In the first porous plate member 14, an annular wall 14a is formed at a circumferential edge of a circular bottom surface, and the annular wall 14a is in press-contact with the inner wall surface of the cylindrical housing 10, and thereby the first porous plate member 14 is fixed.

The space surrounded by the igniter 16 (the igniter 16 and the collar 17), the cylindrical housing 10 and the first porous plate member 14 is the first combustion chamber 20. The first combustion chamber 20 is filled with a first gas generating agent (not depicted in the drawing).

The first gas generating agent is in contact with the ignition portion 16a of the igniter 16. The through-hole of the first porous plate member 14 is an opening which is smaller in size than the first generating agent. The through-hole may be closed with a seal tape.

A gas generating agent, which has a good ignition ability and is capable of maintaining combustion (a high combustion temperature), can be used as the first gas generating agent. The combustion temperature of the first gas generating agent is desirably within a range of 1700° C. to 3000° C. For example, an agent which includes nitroguanidine (34 mass %) and strontium nitrate (56 mass %) and is in a disk-like shape with an outer diameter of 1.5 mm and a thickness of 1.5 mm can be used as the first gas generating agent.

The first gas generating agent is retained by being pressed towards the igniter 16 by the first porous plate member 14.

A cylindrical member 30 is disposed inside the cylindrical housing 10.

The cylindrical member 30 has a bottom portion 31 having a through-hole 31a in the center, a circumferential wall portion 32 having a large number of through-holes (gas inlet/outlet holes 37), and an enlarged-diameter portion 33 formed at an opening.

In the cylindrical member 30, the enlarged-diameter portion 33 is in press-contact with the inner circumferential surface of the cylindrical housing 10.

Due to the difference between the outer diameter of the enlarged-diameter portion 33 and the outer diameter of the circumferential wall portion 32, a first cylindrical space 35 serving as a first gas passage of a uniform width is formed between the cylindrical member 30 and an inner wall surface 10c of the cylindrical housing 10.

A plurality of gas inlet/outlet holes 37 formed in the circumferential wall portion 32 of the cylindrical member 30 are formed equidistantly in the axial direction and equidistantly in the circumferential direction.

The gas inlet/outlet holes 37 may be formed in the circumferential wall portion 32 so as to be concentrated to the side of the diffuser portion 12, or so that the opening area thereof increases towards the diffuser portion 12.

The gas inlet/outlet hole 37 is an opening which is smaller in size than a second gas generating agent 50.

A step portion that mates a circumferential edge at the opening of the enlarged-diameter portion 33, or a protrusion engaging therewith, may be formed on the inner wall surface 10c of the cylindrical housing 10 for fixing the cylindrical member 30.

In the cylindrical member 30, a through-hole 31a in the bottom portion 31 fits onto a protrusion 41a formed in a bottom portion 41 of the cup member 40.

The cylindrical member 30 is fixed in both the axial direction and the radial direction and disposed coaxially with the cylindrical housing 10.

A second porous plate member 24 is disposed between the cylindrical member 30 and the first porous plate member 14.

In the second porous plate member 24, an annular wall 24a is formed at a circumferential edge of a circular bottom surface, and the annular wall 24a is in press-contact with the inner wall surface of the cylindrical housing 10, and thereby the second porous plate member 24 is fixed.

A space 18 is formed between the second porous plate member 24 and the first porous plate member 14. The annular wall 24a extends towards the igniter 16.

The second combustion chamber 25 is formed, being surrounded by the second porous plate member 24, the cylindrical member 30 and the cylindrical housing 10. The second combustion chamber 25 is filled with the second gas generating agent 50.

A through-hole in the second porous plate member 24 is an opening which is smaller in size than the second gas generating agent 50. The through-hole may be closed with a seal tape.

The second combustion chamber 25 includes a space between the enlarged-diameter portion 33 of the cylindrical member 30 and the second porous plate member 24 and a residual space, which form, as a whole, a single combustion chamber.

A gas generating agent with a combustion temperature lower than that of the first gas generating agent is used as the second gas generating agent 50. The combustion temperature of the second gas generating agent 50 is desirably within a range of 1000° C. to 1700° C. For example, an agent which includes guanidine nitrate (41 mass %), basic copper nitrate (49 mass %) and a binder or an additive and is in a single-perforated columnar shape with an outer diameter of 1.8 mm, an inner diameter of 0.7 mm and a length of 1.9 mm can be used as the second gas generating agent.

The second gas generating agent 50 is retained by being pressed towards the diffuser portion 12 by the second porous plate member 24. Therefore, the interior of the second combustion chamber 25 is densely filled with the second gas generating agent 50 which is thus prevented from moving and forming a gap.

The cup member 40 serving as a gas diverting member is disposed between the diffuser portion 12 and the cylindrical member 30 inside the cylindrical housing 10.

The cup member 40 has the bottom portion 41 and a circumferential wall portion 42 and also has a short flange portion 43 at an opening 40a.

The circumferential wall portion 42 has a plurality of first gas passage holes 44a, and these holes are formed equidistantly in the circumferential direction.

The boundary portion of the outer surface of the bottom portion 41 and the circumferential wall portion 42 is rounded. In the central portion, the protrusion 41a is formed such as to extend towards the igniter 16, and the surface excluding the protrusion 41a is flat.

A ratio (L2/L1) of a length (L2) of the cup member 40 and a length (L1) of the cylindrical housing 10 is preferably 0.2 to 0.4.

The length (L1) of the cylindrical housing 10 is a length from the first end portion 10a to the second end portion 10b.

Figure 4:
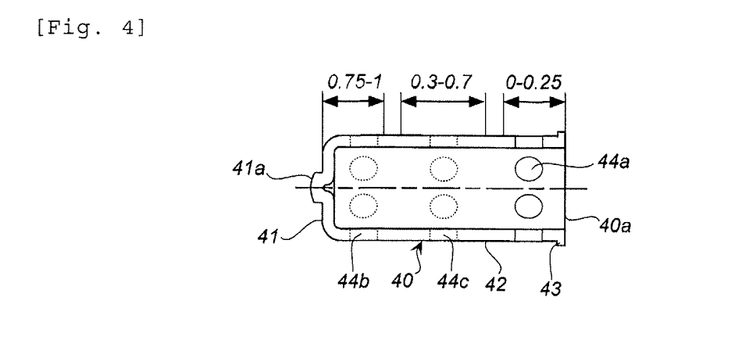
FIG. 4 shows a cross-sectional view in the axial direction which illustrates the formation locations of gas passage holes in the cup member depicted in FIG. 1.

The length (L2) of the cup member is a length from the outer surface (the flat surface excluding the protrusion 41a) of the bottom portion 41 to the opening 40a, as depicted in FIG. 4.

The short flange portion 43 is press-fitted to the flange portion 12c and the annular wall portion 12d of the diffuser portion 12 to fix the cup member 40.

The first gas passage hole 44a and the opening 40a of the cup member 40 may be closed with a seal tape to prevent moisture penetration.

The outer diameter of the circumferential wall portion 42 of the cup member 40 is smaller than the inner diameter of the cylindrical housing 10. As a result, a second cylindrical space 45 serving as a second gas passage is present between the circumferential wall portion 42 and the inner wall surface 10c of the cylindrical housing 10.

The second cylindrical space 45 serving as the second gas passage has a dead end at the flange portion 12c of the diffuser portion.

The second cylindrical space 45 serving as the second gas passage communicates with the first cylindrical space 35 serving as the first gas passage.

A ratio (L12/L11) of a length (L12) of the second cylindrical space serving as the second gas passage and a length (L11) of the first cylindrical space serving as the first gas passage is preferably within a range of 0.40 to 0.60.

The first gas passage holes 44a are formed in part of the circumferential wall portion 42 on the side of the opening of the cup member 40 and face the second cylindrical space 45 serving as the second gas passage.

As depicted in FIG. 4, the first gas passage holes 44a are preferably formed within a range of 0.25 (0 to 0.25 in FIG. 4) from the opening 40a, where the length from the opening 40a to the outer surface of the bottom portion 41 in the cup member 40 is taken as 1.

As depicted in FIG. 1, when the cup member 40 has the first gas passage holes 44a, the length of the second gas passage (the second cylindrical space) 45 from the second combustion chamber 25 to the first gas passage hole 44a is the largest, and combustion gas contacts with the wall surface (the inner wall surface 10c of the cylindrical housing and the circumferential wall portion 42 of the cup member 40) of the second gas passage (the second cylindrical space) 45 over a longer period of time. As a result, the effect of decreasing the temperature of the combustion gas is enhanced.

Figure 2:
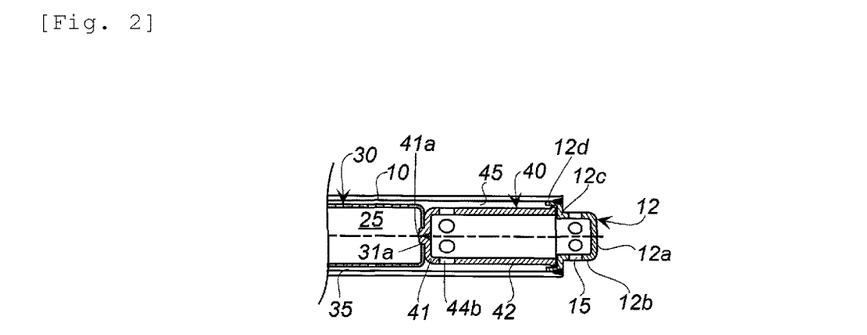
FIG. 2 shows a partial cross-sectional view of an embodiment other than that depicted in FIG. 1.

The cup member 40 having second gas passage holes 44b, such as depicted in FIG. 2, can be used instead of the one having the first gas passage holes 44a depicted in FIG. 1.

The second gas passage holes 44b are formed in part of the circumferential wall portion 42 on the side of the bottom portion 41 of the cup member 40 and face the second cylindrical space 45 serving as the second gas passage.

As depicted in FIG. 4, the second gas passage holes 44b are preferably formed within a range of 0.75 to 1 from the opening 40a, where the length from the opening 40a to the outer surface of the bottom portion 41 in the cup member 40 is taken as 1.

When the cup member 40 has the second gas passage holes 44b, the length of the second gas passage (the second cylindrical space) 45 from the second combustion chamber 25 to the second gas passage hole 44b is the shortest. As a result, the decrease in temperature of the combustion gas is less than that attained with the first gas passage holes 44a. However, the depth from the second gas passage holes 44b to the closing surface (the flange portion 12c) of the second gas passage (the second cylindrical space) is the largest. As a result, the space from the second gas passage holes 44b to the closing surface (the flange portion 12c) of the second gas passage (the second cylindrical space) 45 becomes a pocket portion and the effect of capturing the mist is enhanced.

Figure 3:
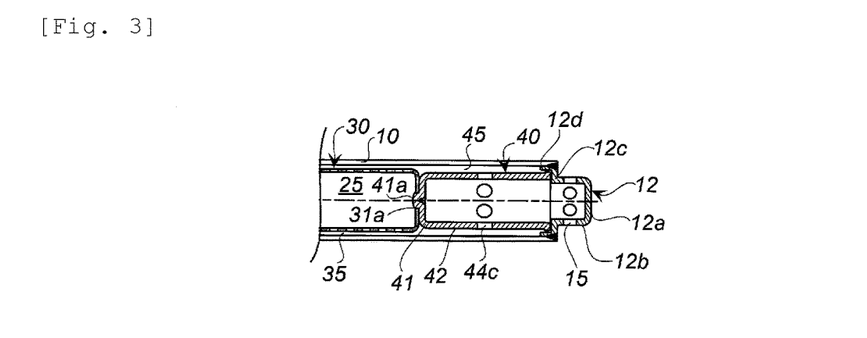
FIG. 3 shows a partial cross-sectional view of an embodiment other than those depicted in FIG. 1 and FIG. 2.

The cup member 40 having the third gas passage holes 44c, such as depicted in FIG. 3, can be used instead of the one having the first gas passage holes 44a depicted in FIG. 1.

The third gas passage holes 44c are formed between the first gas passage holes 44a and the second gas passage holes 44b and face the second cylindrical space 45 serving as the second gas passage.

As depicted in FIG. 4, the third gas passage holes 44c are preferably formed within a range of 0.3 to 0.7 from the opening, where the length from the opening 40a to the outer surface of the bottom portion 41 in the cup member 40 is taken as 1.

When the cup member 40 has the third gas passage holes 44c, the effect of decreasing the temperature of the combustion gas is: the first gas passage hole 44a>the third gas passage hole 44c>the second gas passage hole 44b, and the effect of capturing the mist of the combustion gas is: the second gas passage hole 44b>the third gas passage hole 44c>the first gas passage hole 44a.

Therefore the effect of decreasing the temperature of the combustion gas and the effect of capturing the mist of the combustion gas are adjusted by shifting an axial location of the third gas passage holes 44c closer to the first gas passage holes 44a, shifting an axial location of the third gas passage holes 44c closer to the second gas passage holes 44b, or setting the axial location of the third gas passage holes at the middle therebetween.

A method of assembling the gas generator depicted in FIG. 1 will be explained hereinbelow.

The diffuser portion 12 having the gas discharge ports 15 is fixed by welding to the opening at the second end portion 10b of the cylindrical housing 10.

Then, the cup member (the gas diverting member) 40 is press-fitted and attached to the flange portion 12c so that the opening of the cup member faces the diffuser portion 12.

The cylindrical member 30 is then press-fitted from the first end portion 10a of the cylindrical housing 10. In this case, the cylindrical member 30 is attached such that the enlarged-diameter portion 33 of the cylindrical member 30 is abutted against the inner wall surface 10c of the cylindrical housing 10 and the through-hole 31a of the cylindrical member 30 is fitted to the protrusion 41a of the cup member (the gas diverting member) 40. By so attaching the cylindrical member 30, the positioning and fixing are facilitated.

Thereafter, the inside of the cylindrical member 30 is filled, with tapping, with a prescribed amount of the second gas generating agent 50. The second porous plate member 24 is then press-fitted to define the second combustion chamber 25 filled with the second gas generating agent 50. As a result of press-fitting the second porous plate member 24, the second gas generating agent 50 is densely filled and prevented from moving. Therefore, the occurrence of a gap in the second combustion chamber 25 is prevented.

Thereafter, the first porous plate member 14 is press-fitted, and the first gas generating agent is filled to abut against the first porous plate member 14. At first, the first porous plate member 14 is disposed closer to the first end portion 10a, and the first porous plate member 14 is then pushed inside together with the first gas generating agent at the time of inserting the igniter 16 fixed to the collar 17 from the first end portion 10a.

The igniter 16 fixed to the collar 17 is then fixed to define the first combustion chamber 20.

The operation of the gas generator depicted in FIG. 1 will be explained hereinbelow.

The igniter 16 is actuated to burn the first gas generating agent in the first combustion chamber 20, a combustion product (a flame or a high-temperature gas) is generated therefrom and the combustion product passes through the openings of the first porous plate member 14 and enters the space 18. Further, since the inside of the first combustion chamber 20 is densely filled with the first gas generating agent, patchy ignitions (the patchy burnings) are unlikely to occur, and the first gas generating agent burns uniformly. The combustion product advances into the space 18.

The combustion product passes from the space 18 through the through-holes of second porous plate member 24 and ignites the second gas generating agent 50 present inside the second combustion chamber 25. The combustion product generated from the first combustion chamber 20 once enters the space 18, and thereby the second gas generating agent 50 adjacent to the second porous plate member 24 starts burning uniformly from the end surface. Therefore, patchy ignitions are unlikely to occur.

The flow of the combustion product of the second gas generating agent 50 is accelerated by the enlarged-diameter portion 33. Further, since the enlarged-diameter portion 33 and the inner wall surface 10c of the cylindrical housing 10 are in press-contact with each other, the combustion product does not flow from the press-contact portion into the first cylindrical space 35.

The combustion gas and the combustion product flow out from the gas inlet/outlet holes 37 into the first cylindrical space 35 and collide with the inner wall surface 10c of the cylindrical housing 10. As a result, the direction thereof is changed towards the diffuser portion 12. During this process, the residue contained therein adheres to the inner wall surface 10c of the cylindrical housing.

The combustion gas and combustion product, which flow out of the gas inlet/outlet holes 37 into the first cylindrical space 35, repeatedly go in and out of the second combustion chamber 25 via the gas inlet/outlet holes 37 during moving in the first cylindrical space 35. Thereby, the combustion of the second gas generating agent 50 is promoted.

Further, the combustion gas and the combustion product enter the second cylindrical space 45 serving as the second gas passage, and then, enter the cup member 40 via the first gas passage holes 44a and are discharged from the gas discharge ports 15 of the diffuser portion 12.

In the gas generator depicted in FIG. 1, the ratio (L2/L1) of the length (L2) of the cup member 40 serving as a gas diverting member and the length (L1) of the cylindrical housing 10 is 0.25.

Further, in the gas generator depicted in FIG. 1, the ratio (L12/L11) of the length (L12) of the second cylindrical space 45 serving as the second gas passage and the length (L11) of the first cylindrical space 35 serving as the first gas passage is 0.45.

FIG. 1 is not intended to represent actual dimensions. Therefore, the aforementioned numerical values are not obtained by measurements performed on the drawing.

As indicated hereinabove, in the gas generator depicted in FIG. 1, since a sufficient length is ensured as the length (L2) of the cup member 40, it is possible to form a gas passage hole at a location selected from the axially different locations of the first gas passage holes 44a, the second gas passage holes 44b, and the third gas passage holes 44c, as depicted in FIG. 1 to FIG. 3.

The length of the cylindrical housing 10 (the length of the gas generator) is determined in accordance with a type of the vehicle and an installation location where the gas generator is to be installed.

In the gas generator depicted in FIG. 1, the intended effects of decreasing the temperature of the combustion gas and capturing the mist of the combustion gas can be obtained by selecting one of the first gas passage holes 44a, the second gas passage holes 44b and the third gas passage holes 44c as the gas passage holes in the cup member 40.

The ratio of L1, L2 (L12) and L11 in the related art (US-A No. 2008/0078486 and JP-A No. 2011-157025) is investigated hereinbelow.

Figure 5:
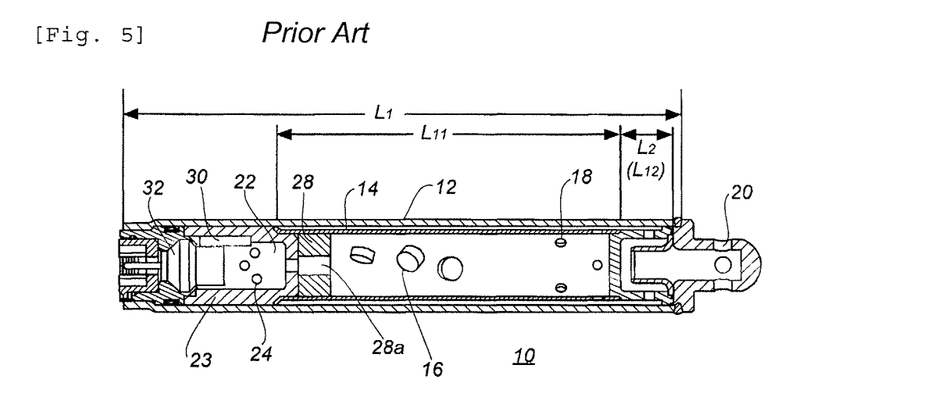
FIG. 5 is FIG. 1 in US-A No. 2008/0078486.
Figure 6:
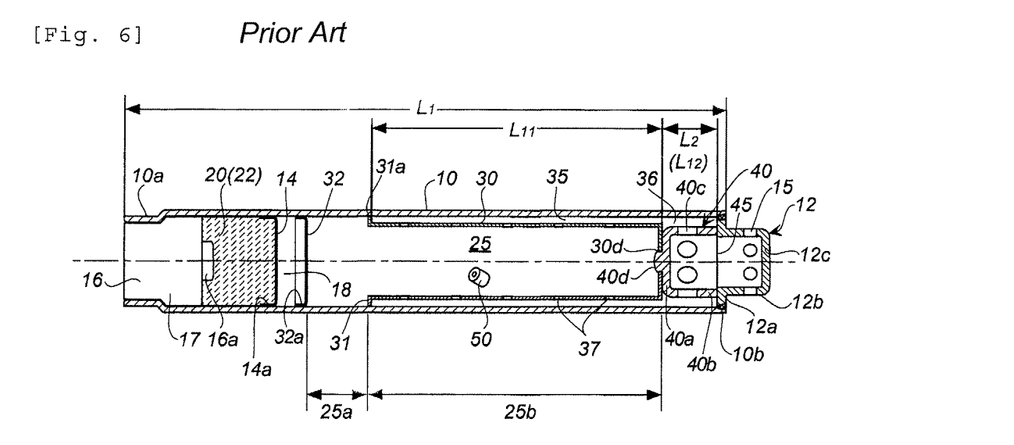
FIG. 6 is FIG. 1 in JP-A No. 2011-157025.

The respective ratios are determined from the numerical values obtained by measurements from FIG. 5 (FIG. 1 in US-A No. 2008/0078486) and FIG. 6 (FIG. 1 in JP-A No. 2011-157025). L2 and L12 do not match, but in FIG. 5, the length L12 is shown under an assumption that L2=L12.

The ratios in the gas generator depicted in FIG. 5 are as follows:

$L2/L1$=19 mm/171 mm=0.111; and $L12/L11$=19 mm/106 mm=0.179.

The ratios in the gas generator depicted in FIG. 6 are as follows:

$L2/L1$=21 mm/200 mm=0.105; and $L12/L11$=21 mm/97 mm=0.216.

As mentioned hereinabove, the ratios in the gas generator depicted in FIG. 1 are L2/L1=0.25 and L12/L11=0.45.

Comparing these numerical values, in the gas generators depicted in FIG. 5 (FIG. 1 in US-A No. 2008/0078486) and FIG. 6 (FIG. 1 in JP-A No. 2011-157025), the length of the members corresponding to the cup member 40 of the present invention is shorter. As a result, gas passage holes cannot be formed at substantially different axial locations (three locations).

Further, the gas generator depicted in FIG. 5 (FIG. 1 in US-A No. 2008/0078486) is characterized by a double-wall structure, and gas passage holes are not to be formed at different axial locations (three locations).

EXAMPLES

The gas generator shown in FIG. 1, FIG. 2 and FIG. 3 (L2/L1=0.25, L12/L11=0.45) was used to conduct a tank combustion test (60 liters) described in Paragraph [0098] in JP-A No. 2011-97176.

The number of gas passage holes was six, and the diameter of one hole was 3.7 mm.

4 g of a gas generating agent including nitroguanidine/strontium nitrate/carboxymethyl cellulose sodium salt (3/6/1) was used as the first gas generating agent.

20 g of a gas generating agent including guanidine nitrate/basic copper nitrate/carboxymethyl cellulose sodium salt (4/5/1) was used as the second gas generating agent.

<Tank Combustion Test>

A gas generator for an air bag was fixed in a SUS (stainless steel) tank having an inner volume of 60 liters and was connected to an electric ignition circuit, provided outside the tank, after sealing the tank at a room temperature.

By setting the time when an ignition electric circuit switch was turned on (an ignition electric current is applied) to zero (0), the pressure increase inside the tank was measured by a pressure transducer, independently placed in the tank, for a time period between 0 and 100 milliseconds.

The measurement data was computer processed to obtain a tank pressure/time curve. And a curve estimating the performance of the gas generator (hereinafter, refer to as "a tank curve") was obtained.

The temperature of the gas discharged from the gas generator was calculated from the maximum tank pressure and the generated gas amount (number of moles).

Figure 7:
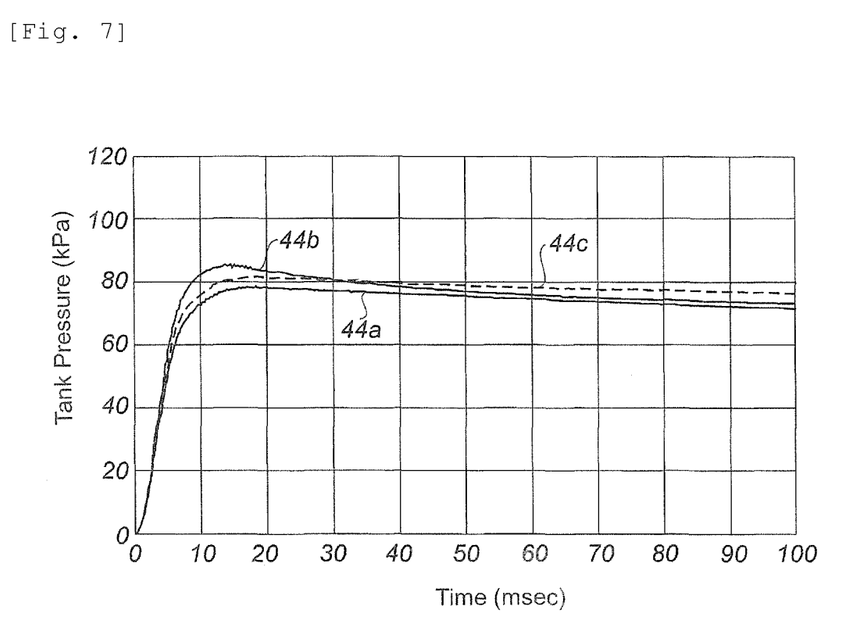
FIG. 7 shows measurement results obtained in Examples.

The pressure/time curve is depicted in FIG. 7.

The temperature of the gas discharged from the gas generator (provided with the first gas passage holes 44a) depicted in FIG. 1 was the lowest (750° C.)

The temperature of the gas discharged from the gas generator (provided with the second gas passage holes 44b) depicted in FIG. 2 was the highest (840° C.)

The temperature of the gas discharged from the gas generator (provided with the third gas passage holes 44c) depicted in FIG. 3 was intermediate (790° C.).

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator comprising
a cylindrical housing in which an ignition device is attached at a first end portion and a diffuser portion having a gas discharge port is attached at a second end portion on the opposite side of the first end portion,
a combustion chamber, which is formed on the side of the ignition device, and a cup member, which serves as a gas diverting member and is disposed between the combustion chamber and the diffuser portion, being provided inside the cylindrical housing,
a ratio (L2/L1) of a length (L2) of the cup member serving as the gas diverting member and a length (L1) of the cylindrical housing being 0.2 to 0.4,
the cup member serving as the gas diverting member being disposed such that a bottom portion is located on the side of the combustion chamber, an opening is located on the side of the diffuser portion and a circumferential wall portion forms a cylindrical space serving as a gas passage with an inner circumferential wall surface of the cylindrical housing therebetween,
the cup member having one gas passage hole selected from:
a first gas passage hole that is formed in part of the circumferential wall portion on the side of the opening and faces the cylindrical space serving as the gas passage;
a second gas passage hole that is formed in part of the circumferential wall portion on the side of the bottom portion and faces the cylindrical space serving as the gas passage; and
a third gas passage hole that is formed between the first gas passage hole and the second gas passage hole and faces the cylindrical space serving as the gas passage,
the cylindrical space serving as the gas passage communicating with the combustion chamber and being closed on the side of the diffuser portion.

2. A gas generator comprising
a cylindrical housing in which an ignition device is attached at a first end portion and a diffuser portion having a gas discharge port is attached at a second end portion on the opposite side of the first end portion,
a combustion chamber, which is formed on the side of the ignition device, and a cup member, which serves as a gas diverting member and is disposed between the combustion chamber and the diffuser portion, being provided inside the cylindrical housing,
a ratio (L2/L1) of a length (L2) of the cup member serving as the gas diverting member and a length (L1) of the cylindrical housing being 0.2 to 0.4,
a cylindrical member, which has a plurality of through-holes in a circumferential wall portion, being disposed inside the combustion chamber,
the cylindrical member being disposed such that an opening is located on the side of the ignition device, a bottom portion is located on the side of a bottom portion of the a cup member serving as a gas diverting member, and a circumferential wall portion forms a first cylindrical space serving as a first gas passage with an inner circumferential wall surface of the cylindrical housing therebetween,
the cup member serving as the gas diverting member being disposed such that a bottom portion is located on the side of the combustion chamber, an opening is located on the side of the diffuser portion and a circumferential wall portion forms a second cylindrical space serving as a second gas passage with an inner circumferential wall surface of the cylindrical housing therebetween,
the cup member having one gas passage hole selected from:
a first gas passage hole that is formed in part of the circumferential wall portion on the side of the opening and faces the second cylindrical space serving as the second gas passage;
a second gas passage hole that is formed in part of the circumferential wall portion on the side of the bottom portion and faces the second cylindrical space serving as the second gas passage; and
a third gas passage hole that is formed between the first gas passage hole and the second gas passage hole and faces the second cylindrical space serving as the second gas passage,
the second cylindrical space serving as the second gas passage communicating with the first cylindrical space and being closed on the side of the diffuser portion.

3. The gas generator according to claim 2, wherein a ratio (L12/L11) of a length (L12) of the second cylindrical space serving as the second gas passage and a length (L11) of the first cylindrical space serving as the first gas passage is within a range of 0.40 to 0.60.

4. The gas generator according to claim 1, wherein
when a length from the opening to the outer surface of the bottom portion in the cup member is taken as 1,
the first gas passage hole is formed within a range of 0.25 from the opening,
the second gas passage hole is formed within a range of 0.75 to 1 from the opening, and
the third gas passage hole is formed within a range of 0.3 to 0.7 from the opening.

5. The gas generator according to claim 1, wherein
each of the first gas passage hole, the second gas passage hole and the third gas passage hole is formed as two to eight holes arranged equidistantly in the circumferential direction.

6. The gas generator according to claim 1, wherein
the combustion chamber is divided into two combustion chambers by two porous plate members disposed at a distance from each other.

7. The gas generator according to claim 2, wherein
when a length from the opening to the outer surface of the bottom portion in the cup member is taken as 1,
the first gas passage hole is formed within a range of 0.25 from the opening,
the second gas passage hole is formed within a range of 0.75 to 1 from the opening, and
the third gas passage hole is formed within a range of 0.3 to 0.7 from the opening.

8. The gas generator according to claim 2, wherein
each of the first gas passage hole, the second gas passage hole and the third gas passage hole is formed as two to eight holes arranged equidistantly in the circumferential direction.

9. The gas generator according to claim 2, wherein
the combustion chamber is divided into two combustion chambers by two porous plate members disposed at a distance from each other.

* * * * *